(12) United States Patent
Kuo

(10) Patent No.: US 6,290,106 B1
(45) Date of Patent: Sep. 18, 2001

(54) ANGLE ADJUSTABLE GREASE DISPENSING GUN

(76) Inventor: Wen I Kuo, No. 245, Dong Ping Road, Tai Ping Shiang, Taichung Hsien (TW)

( * ) Notice: Subject to any disclaimer, the term of this patent is extended or adjusted under 35 U.S.C. 154(b) by 0 days.

(21) Appl. No.: 09/755,753

(22) Filed: Jan. 8, 2001

(51) Int. Cl.⁷ .................................................. B67D 5/42
(52) U.S. Cl. .......................... 222/389; 222/261; 222/256
(58) Field of Search .................................. 222/389, 387, 222/256, 257, 258, 259, 260, 261, 262, 268, 160, 166, 167

(56) References Cited

U.S. PATENT DOCUMENTS

| | | | | |
|---|---|---|---|---|
| 1,708,781 | * | 4/1929 | Barks | 222/261 |
| 1,807,421 | * | 5/1931 | Mahoney | 222/261 |
| 1,981,905 | * | 11/1934 | Davis | 221/47.4 |
| 1,993,160 | * | 3/1935 | Gentry, Jr. | 221/47.3 |
| 2,039,881 | * | 5/1936 | Carter | 221/47.3 |
| 2,056,249 | * | 10/1936 | Bystricky | 285/170 |
| 2,060,297 | * | 11/1936 | Fox | 221/47.4 |
| 2,128,382 | * | 8/1938 | Tear | 221/47.3 |
| 2,142,081 | * | 1/1939 | Olive | 221/47.3 |
| 2,183,013 | * | 12/1939 | Davis | 221/47.3 |
| 2,435,647 | * | 2/1948 | Engseth | 103/153 |
| 2,459,296 | * | 1/1949 | Smith | 18/3.5 |
| 3,130,723 | * | 4/1964 | Vendity et al. | 128/173 |
| 3,603,487 | * | 9/1971 | Cook | 222/389 |
| 5,067,591 | * | 11/1991 | Fehlig | 184/55.1 |
| 5,474,214 | * | 12/1995 | Chung et al. | 222/262 |

\* cited by examiner

Primary Examiner—Joseph A. Kaufman
Assistant Examiner—Frederick Nicolas
(74) Attorney, Agent, or Firm—Charles E. Baxley

(57) ABSTRACT

A grease dispensing gun includes a handle having a trigger device and a fitting respectively connected thereto. A connection member is connected to a top end of the handle and a first end of a barrel is rotatably engaged with an inner periphery of the connection member. A container is connected to the nozzle member. The first end of the barrel has a flange extending radially inward therefrom and a board is securely engaged with the flange. A bolt extends through the connection member and is engaged with the board.

3 Claims, 3 Drawing Sheets

ANGLE ADJUSTABLE GREASE DISPENSING GUN

FIELD OF THE INVENTION

The present invention relates to a grease dispensing gun wherein the handle and the barrel of the grease gun can be pivoted with each other so as to meet the requirements when in use.

BACKGROUND OF THE INVENTION

A conventional grease dispensing gun 10 is shown in FIG. 1 and generally includes a handle 13 with a trigger means 131, a barrel 12 connected to the handle 13 and a container 14 connected to the barrel 12 of the grease gun. The container 14 receives grease therein so as to be provided into the barrel 12 and dispensed form a nozzle member 11 connected to a front end of the barrel 11. A piston 121 connected to a piston rod is received in the barrel 12 and a spring 122 is mounted to the piston rod so that when pulling the trigger means 131, the air pressure provided from a fitting connected to a lower end of the handle 13 will send the grease 14 out from the nozzle member 11. However, because the barrel 12, the handle 13 and the container 14 are made to be an one-piece member, so that the user sometimes has to rotate the whole grease gun to access a desired position because the space where the desired position does not allow the container 14 to be inserted. The user's hand turns an angle to hold the handle 13 and this will affect the aim of the nozzle member 11.

The present invention intends to provide a grease dispensing gun wherein a bolt is used to connect the barrel and the handle so that the barrel can be rotated to shift the position of the container on the barrel.

SUMMARY OF THE INVENTION

In accordance with one aspect of the present invention, there is provided a grease dispensing gun and comprising a handle having a trigger device and a fitting respectively connected thereto. A connection member is connected to a top end of the handle and a barrel is rotatably engaged with an inner periphery of the connection member at its first end. A nozzle member is connected to a second end of the barrel and a container is connected to the nozzle member. A board is connected to the first end of the barrel and a bolt extends through the connection member and is engaged with the board.

The primary object of the present invention is to provide a grease dispensing gun wherein the barrel together with the container can be rotated relative to the handle.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
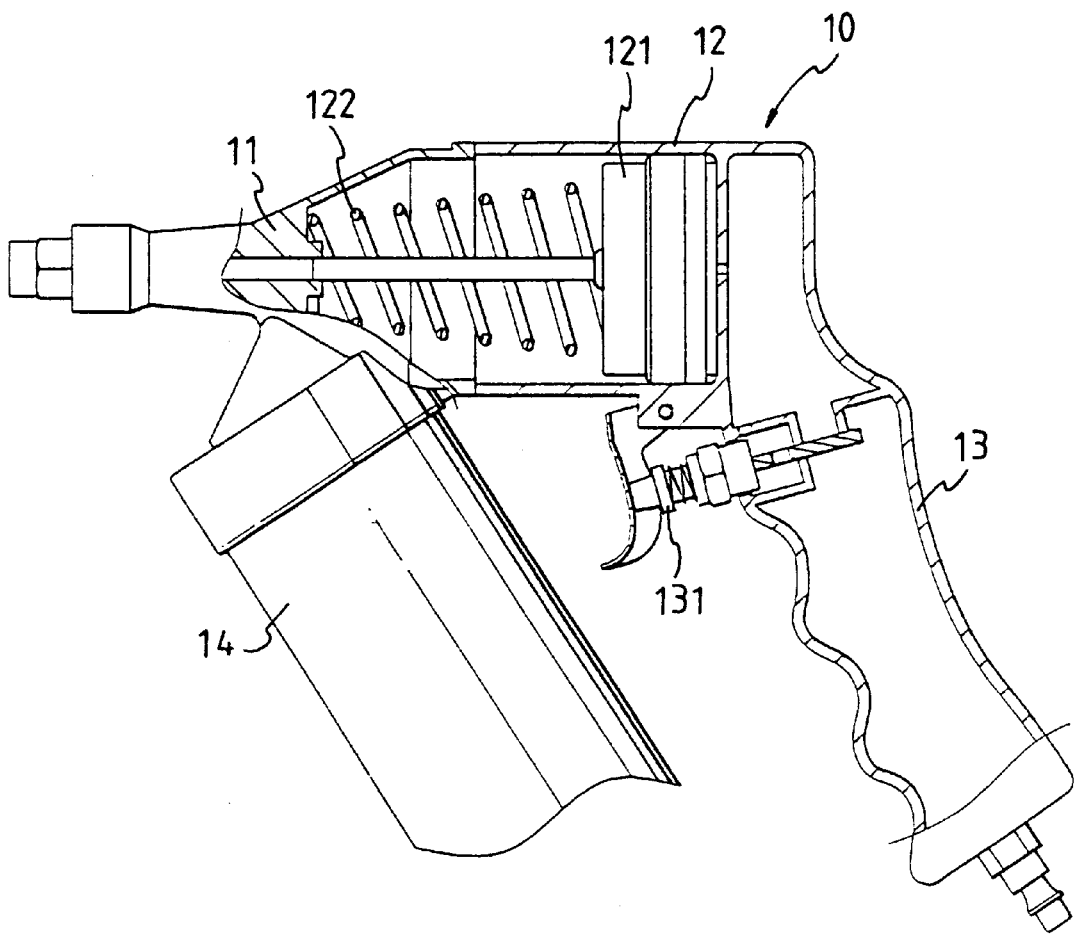
FIG. 1 is a cross sectional view to show a conventional grease dispensing gun.
Figure 2:
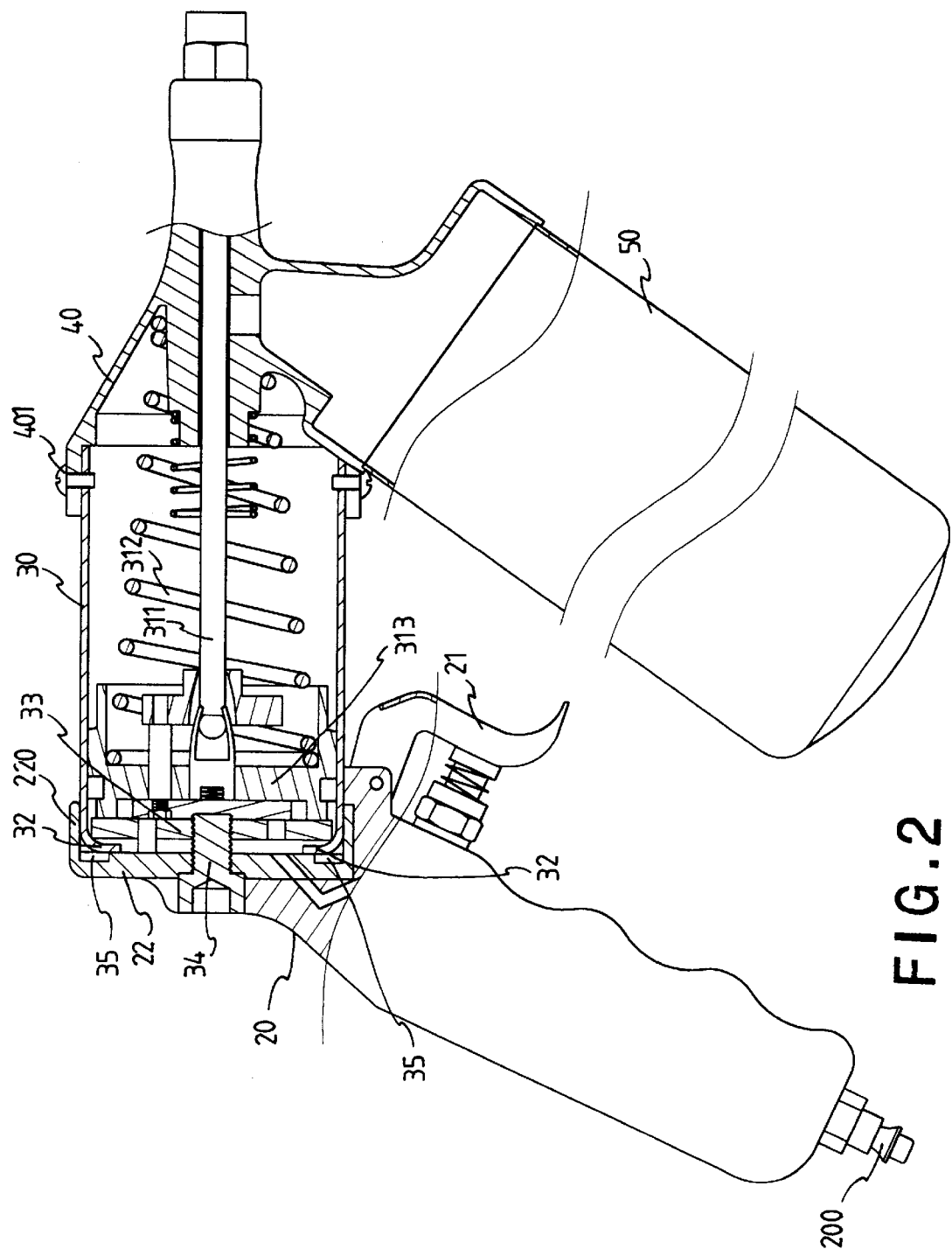
FIG. 2 is a cross sectional view to show a grease dispensing gun of the present invention.
Figure 3:
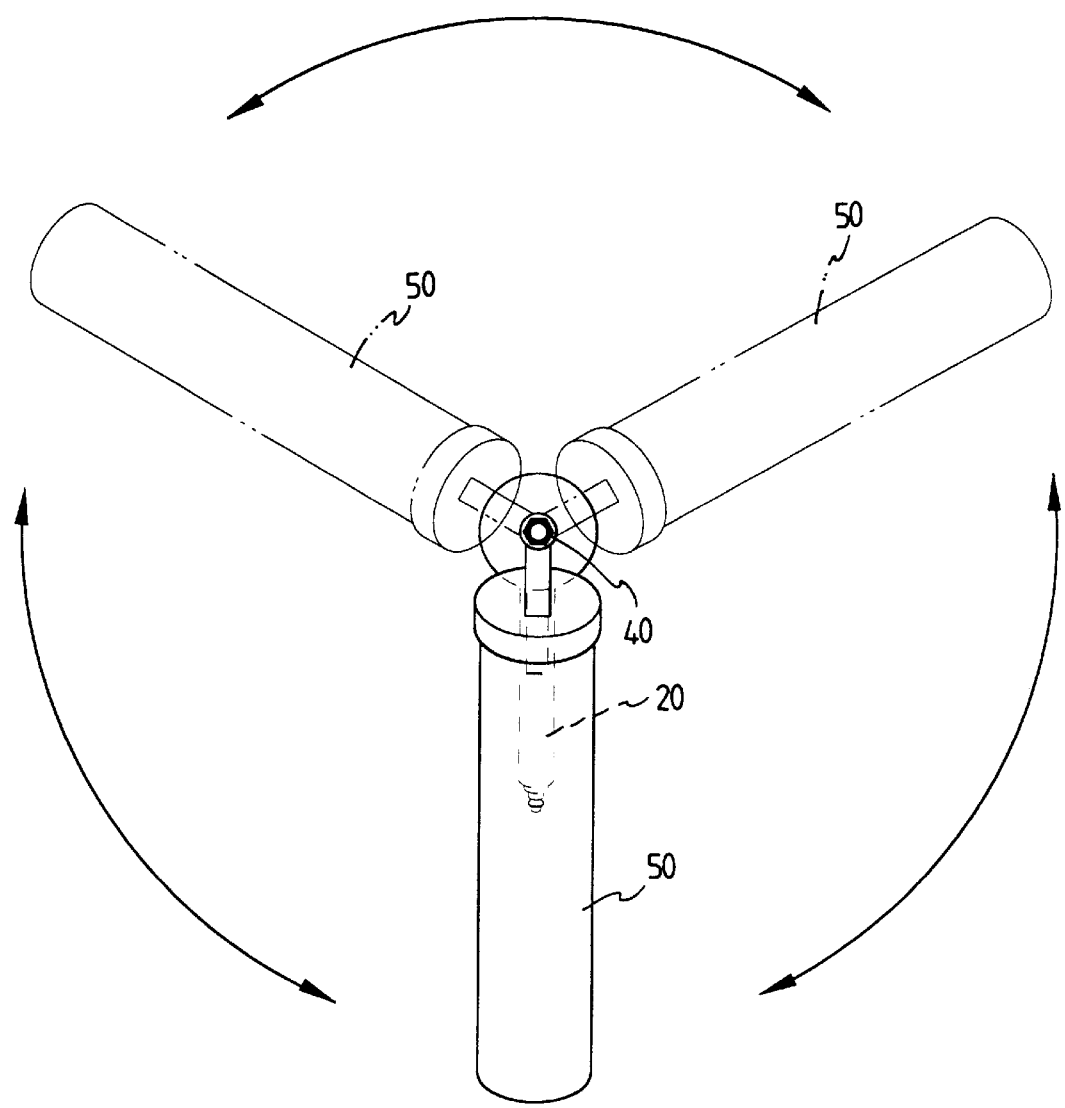
FIG. 3 is an illustrative view to show the container of the grease dispensing gun of the present invention can be rotated about a connection member on a top end of the handle.

Referring to FIGS. 2 and 3, the grease dispensing gun of the present invention comprises a handle 20 having a trigger device 21 connected to a side thereof and a fitting 200 is connected to a lower end of the handle 20 so as to be connected to a hose of a compressor (not shown). A connection member 22 is connected to a top end of the handle 20 and has a first flange 220 extending from a periphery thereof. A first end of a barrel 30 has a second flange 32 extending radially inward therefrom and the second flange 32 is engaged with an inner periphery of the first flange 220 of the connection member 22. A board 33 is securely engaged with the second flange 32 because the diameter of the board 33 is larger than an opening defined by the second flange 32 so that the barrel 30 will not disengage from the board 33. A seal 35 is connected between the second flange 32 and the connection member 22. A nozzle member 40 is connected to a second end of the barrel 30 by bolts 401 and a container 50 is connected to the nozzle member 40. A piston device is received in the barrel 30 and includes a piston rod 311 with a spring 312 mounted thereto and a piston 313 connected to the piston rod 311.

A bolt 34 extends through the connection member 22 and is threadedly engaged with the board 33. The board 33 together with the barrel 30 are connected to the connection member 22.

When adjusting the barrel 30, the bolt 34 is unscrewed to be disengaged from the board 33, and then the barrel 30 can be rotated about the connection member 22. By this way, the container 50 is rotated away from its position while the handle 20 is remained at its position. Therefore, the user can hold the handle as usual and pulls the trigger device 21. Because the user's hand is not turned an angle, the nozzle member 40 can be aimed to a desired position easily.

While we have shown and described various embodiments in accordance with the present invention, it should be clear to those skilled in the art that further embodiments may be made without departing from the scope and spirit of the present invention.

What is clained is:

1. A grease dispensing gun comprising:

a handle having a trigger device and a fitting respectively connected thereto, a connection member connected to a top end of said handle;

a barrel having a first end thereof rotatably engaged with an inner periphery of said connection member, a nozzle member connected to a second end of said barrel and a container connected to said nozzle member, a board connected to said first end of said barrel, and a bolt extending through said connection member and engaged with said board.

2. The grease dispensing gun as claimed in claim 1, wherein said first end of said barrel has a flange extending radially inward therefrom and said board is securely engaged with said flange.

3. The grease dispensing gun as claimed in claim 2, wherein a seal is connected between said flange and said connection member.

* * * * *